June 30, 1953  J. E. STEVENSON  2,643,479
TRAP HOOK
Filed Sept. 17, 1949
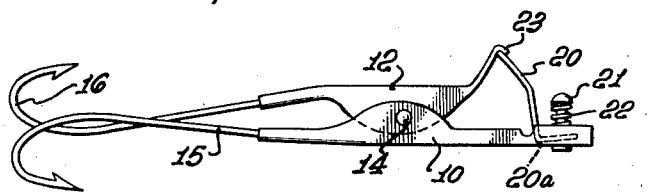
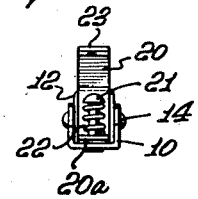
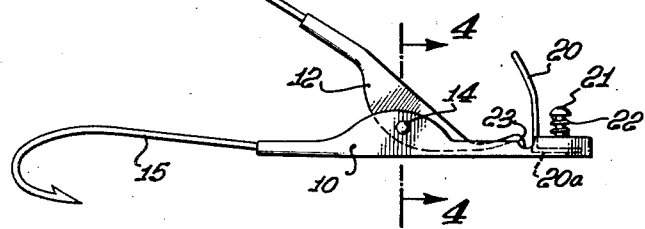
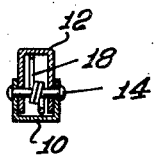
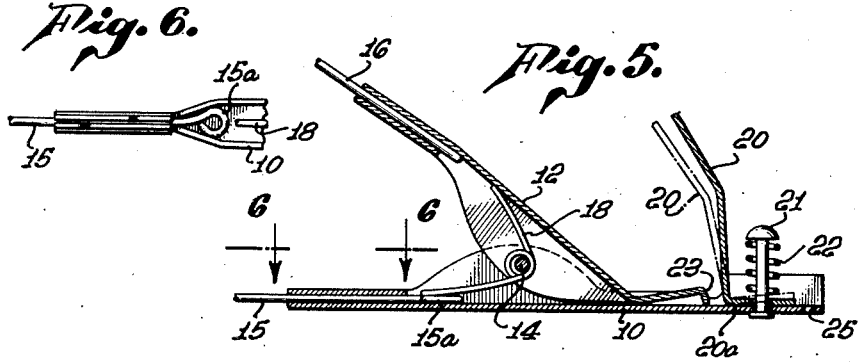
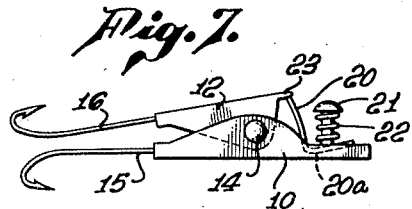
JAMES E. STEVENSON,
INVENTOR.
BY
*Knight & Rodgers*
ATTORNEYS.

Patented June 30, 1953

2,643,479

UNITED STATES PATENT OFFICE 2,643,479

TRAP HOOK

James E. Stevenson, Arcadia, Calif.

Application September 17, 1949, Serial No. 116,265

5 Claims. (Cl. 43—36)

The present invention relates generally to improvements in lures or hooks used for catching fish, and more especially to such a device having one or more spring actuated hooks.

Some fish are able to mouth or nibble the bait and take it off a single hook without themselves being caught. At other times a fish may strike but in such a way that the hook is not well embedded in the flesh so that the hook pulls out when an attempt is made to land the fish.

While mechanically actuated hooks have been previously devised, they have not been fully satisfactory. Some are complicated and so too expensive to manufacture or else they are unreliable in operation. Others are suited only to one type or kind of fishing or certain conditions. As a result they are specialized equipment and are of little value to most fishermen who want a versatile hook of maximum usefulness suitable for trolling or casting under a wide range of conditions.

Hence it is a general object of my invention to devise a fish hook or lure that will insure, as far as possible, that a fish is firmly and reliably held by the hook and cannot get off the hook.

It is also an object of my invention to make such a hook that is usable under all conditions of fishing, will not be sprung by casting, and can be combined with floats, plugs, feathers, spinners, and other auxiliary fishing equipment as desired.

A further object is to make a spring operated fishing lure or hook that is simple in construction and reliable in operation.

These and other objects of my invention are achieved by mounting a fish hook of conventional design on each of a pair of pivotally interconnected body members. A spring on the body normally urges the hooks toward widely separated positions. A latch is provided to hold the hooks in positions close to each other; but when the fish strikes the hooks and pushes them together slightly, the latch releases and the hooks are spread by the spring to become firmly embedded in the fish.

The latch is preferably mounted on one body member to which the leader or line is fastened, to engage the other body member. A second spring is employed to move the latch out of holding position when pressure on it is relieved by the strike of the fish on the hooks.

How the above objects and advantages of my invention, as well as others not specifically mentioned, are attained will be better understood by reference to the following description and the annexed drawings, in which:

Fig. 1 is a side elevation of a lure constructed according to my invention with the hooks in closed position;

Fig. 2 is a side elevation of the lure of Fig. 1 with the hooks in released or spread position;

Fig. 3 is an end elevation of Fig. 1;

Fig. 4 is a vertical section on line 4—4 of Fig. 2;

Fig. 5 is an enlarged vertical longitudinal section through the body with the parts in the position of Fig. 2;

Fig. 6 is a fragmentary plan of a part of one body member and the attached hook, on line 6—6 of Fig. 5; and Fig. 7 is a side elevation of a modified body construction.

The fish lure constructed according to my invention is shown in side elevation in Fig. 1. The term "lure" is used herein to designate the entire assembly in order to distinguish from the hooks themselves which are component parts of the assembly, although the entire device may be also referred to as a fish hook. The body is composed of two members 10 and 12 which are pivotally interconnected at 14 by a pin which passes through the two side flanges on each of the body members and is headed over at each end, as may be seen in Fig. 4. To resist corrosion and rusting I prefer to make the body members of stainless steel, though aluminum alloys have been used when lightness is desired. However, the invention is not limited to any specific materials.

At one side of the pivot 14, body members 10 and 12 are provided with fish hooks 15 and 16 respectively. These hooks may be of any conventional design and may be attached to the body members in any suitable fashion. A very simple and satisfactory way is to wrap a portion of the body member, beyond the side flanges, around the shank of the hook and clamp the body member tightly in position. This operation, commonly referred to in the art as "stoking," has the advantage that it in no way diminishes the strength of the hook as is apt to occur if the hook is heated, as when the hook is spot welded in place. Fish hooks normally have an eye at the outer end of the shank to which a line can be attached. When this eye is located inwardly on the body relative to the part clamped about the hook shank, as at 15a in Fig. 6, the eye not only prevents the hook from pulling out away from the body but, lying flat against the side of the body, keeps the hook from twisting relative to the body.

In order to spread hooks 15 and 16 apart into the position shown in Fig. 2, I provide a suitable type of spring means mounted preferably on the lure body. One suitable type of spring is torsion coil spring 18, shown particularly in Figs. 4 and 5. Spring 18 may conveniently be mounted upon pivot pin 14 with the two free ends of the spring bearing against inside faces of body members 10 and 12 in such a manner that the natural force of the spring normally urges the body members to rotate relative to each other about the pivot into the position of Fig. 5.

The two fish hooks are held in proximity to each other, as shown in Fig. 1, by latch means engaging the body members at the opposite side of pivot 14 from the fish hooks. This latch means includes latch member 20 which is a flat, leaf-like member with a broad side facing forwardly of the lure. Viewed from the side, latch 20 is angular in shape. It is loosely mounted by means of pin 21 on the rearwardly extending portion of body member 10. Compression spring 22 surrounds pin 21 and presses downwardly on the horizontal foot of the latch member which bears against body member 10. The upper end of spring 22 bears against the head on pin 21. The upper or outer end of latch 20 extends upwardly to a suitable location at which it can engage hook or detent 23 formed on the rearward end of body member 12. Latch 20 is moved into this position by rocking it from the solid line position of Fig. 5 to the dot-dash position around the fulcrum formed by the angular bend 20a in the latch. In the dot-dash position detent 23 of body member 12 exerts a compressive force on latch 20. Locking the latch in this position slightly compresses spring 22 which, as will be seen, normally presses downwardly upon the horizontal foot portion of the latch to urge the latch toward the full line position in Fig. 5. Latch 20 may be made as a resilient leaf spring with its lower end fastened to the body member, in which case coil spring 22 can be omitted. But the illustrated construction in which latch 20 is a fairly stiff member is preferred as experience indicates it is more reliable and uniform in operation and less likely to break.

Lower body member 10 is provided with hole 25, or any other suitable means by which the lure may be attached to a leader, a fish line, or other piece of fishing equipment as may be desired. From this description, it will be seen that body member 10 is, in effect, a fixed member and it is to this member that the leader or line is attached. Upper member 12 is free to pivot with respect to the lower stationary member and, by comparison, may be considered as a movable member. It is upon the stationary member that latch 20 is mounted with its free end engageable with the movable member.

In operation, a suitable type of bait is placed upon one or both hooks. If it is placed upon one hook only, it is placed preferably upon hook 15 attached to fixed body member 10. The two hooks are then brought toward each other until they have slightly passed the position of Fig. 1 at which time latch 20 can be moved under and into engagement with detent 23. The normal pressure of spring 18 holds detent 23 in engagement with latch 20, the shape of the members being such that they do not separate under this light but continuous pressure. When the fish strikes the hooks, the pressure of the jaws of the fish brings hooks 15 and 16 together slightly. Only a small movement is sufficient to rotate detent 23 outwardly away from latch 20 and the rearward end of body member 10. Thus the pressure upon latch 20 is released and spring 22 moves the latch to its outer position (full lines in Fig. 5) in which it is free of detent 23. The pressure of spring 18 then forces the two hooks apart so that no matter how widely the fish opens its jaws, the hooks are always in contact with the mouth tissues. This continuous engagement means that one or both of the hooks will become firmly embedded in the mouth of the fish.

It will be noted that the movement of body member 12 and latch 20 with respect to body member 10 is in no way influenced by the pull of the fishing line attached to hole 25 except that that pull tends to fix the position of body member 10 with the result that the other parts move relative thereto. This circumstance insures that the latch is not released or sprung by the pull of the line during casting, which is quite considerable when the lure first strikes the water.

Spreading the hooks by spring 18 causes the hooks to contact and become lodged in the bony structure of the mouth of the fish. The lure cannot be swallowed and pass into the stomach, as is the case with single or non-expanding hooks, with the result that the fish must be cut open to retrieve the hook. With my improved lure, it is only necessary to press the hooks together while drawing the hooks out of the flesh and then remove the lure from the mouth of the fish.

From the above description it is evident that changes may be made in my improved lure by persons skilled in the art without departing from the spirit and scope of my invention. Hence it is to be understood that the foregoing is considered as illustrative of, rather than limitative upon the appended claims.

I claim:

1. A fish lure comprising: a pair of pivotally interconnected body members; a fish hook attached to each of said body members and extending beyond the body members at one side of the pivotal connection; spring means engaging the body members and normally urging one body member to rotate relative to the other body member to spread the hooks apart; a latch member movably mounted on said other body member and movable into engagement with said one body member when the body members are in a position with the hooks slightly spaced from each other, to resist in compression rotation of said one member relative to the other member in a direction tending to spread the hooks but leaving said one member free to rotate in the opposite direction; and a second spring means normally urging the latch member to a position out of engagement with said one body member.

2. A fish lure as in claim 1 that also includes means for attaching a fish line directly to said other body member only independently of the latch means.

3. A fish lure comprising: a pair of body members; pivot means interconnecting the body members for relative swinging movement; a fish hook attached to each body member at one side of the pivot means; spring means engaging the body members at said one side of the pivot and normally urging the body members apart at the position of engagement therewith; a latch member mounted on one body member at the opposite side of the pivot means and engageable with the other body member to resist in compression movement of the body members toward each other at the location of the latch member and disengageable from the other body member upon short relative movement apart of the body members at the location of the latch; a second spring means normally urging the latch member to a non-engaging position; and means for attaching a line to the lure independently of the latch at a position spaced from the pivot.

4. A fish lure comprising: a first body member; a second body member; a pair of fish hooks, one attached to the forward end of each body member to extend forwardly from the associated body member; pivot means pivotally interconnecting the two body members for movement between a position in which the hooks are spread apart and a position in which the hooks are in close proximity to each other with their open ends outwardly and oppositely disposed; spring means engaging the body members to urge them toward a position in which the hooks are spread apart; a latch member mounted on the first body member at the rearward side of the pivot means and engageable with the second body member to resist pivotal movement of the body members toward each other at the position of the latch and in a direction to spread the hooks apart, said latch member being disengaged from the second body member by inwardly and oppositely directed forces on the hooks; and means on the first body member for connecting a line directly to the first body member at a point spaced rearwardly of the pivot means and independently of the latch means.

5. A fish lure as in claim 4 in which the first body member extends rearwardly of the second body member and the latch member is mounted on said rearward extension of the first body member and is movable to a position in the path of movement of the second body member; and which also comprises means biasing the latch toward a position beyond the path of movement of the second body member.

JAMES E. STEVENSON.

References Cited in the file of this patent

UNITED STATES PATENTS

| Number | Name | Date |
| --- | --- | --- |
| 243,622 | Rentz et al. | June 28, 1881 |
| 922,879 | Gabrielson | May 25, 1909 |
| 939,480 | Deggim | Nov. 9, 1909 |
| 1,293,127 | Lantz | Feb. 4, 1919 |
| 2,241,301 | Gall | May 6, 1941 |
| 2,381,231 | Spear | Aug. 7, 1945 |
| 2,442,866 | Stein | June 8, 1948 |